Figure 1:
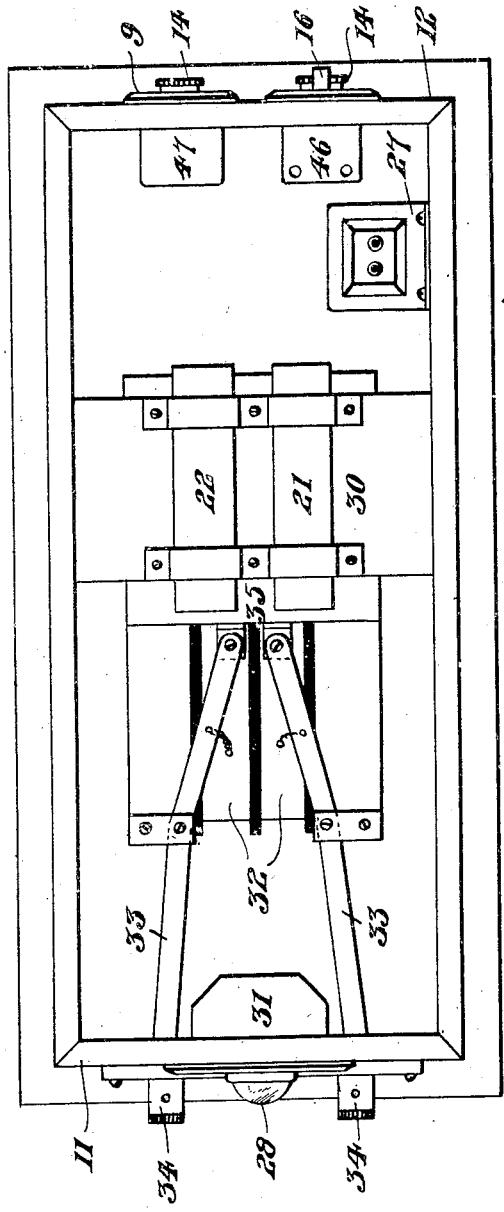

Feb. 3, 1925.  1,525,282
J. L. ENTWISTLE
WIRE INSULATION TESTER
Filed Oct. 15, 1921  2 Sheets-Sheet 1

Inventor
James L. Entwistle
By F. K. Bryant
Attorney

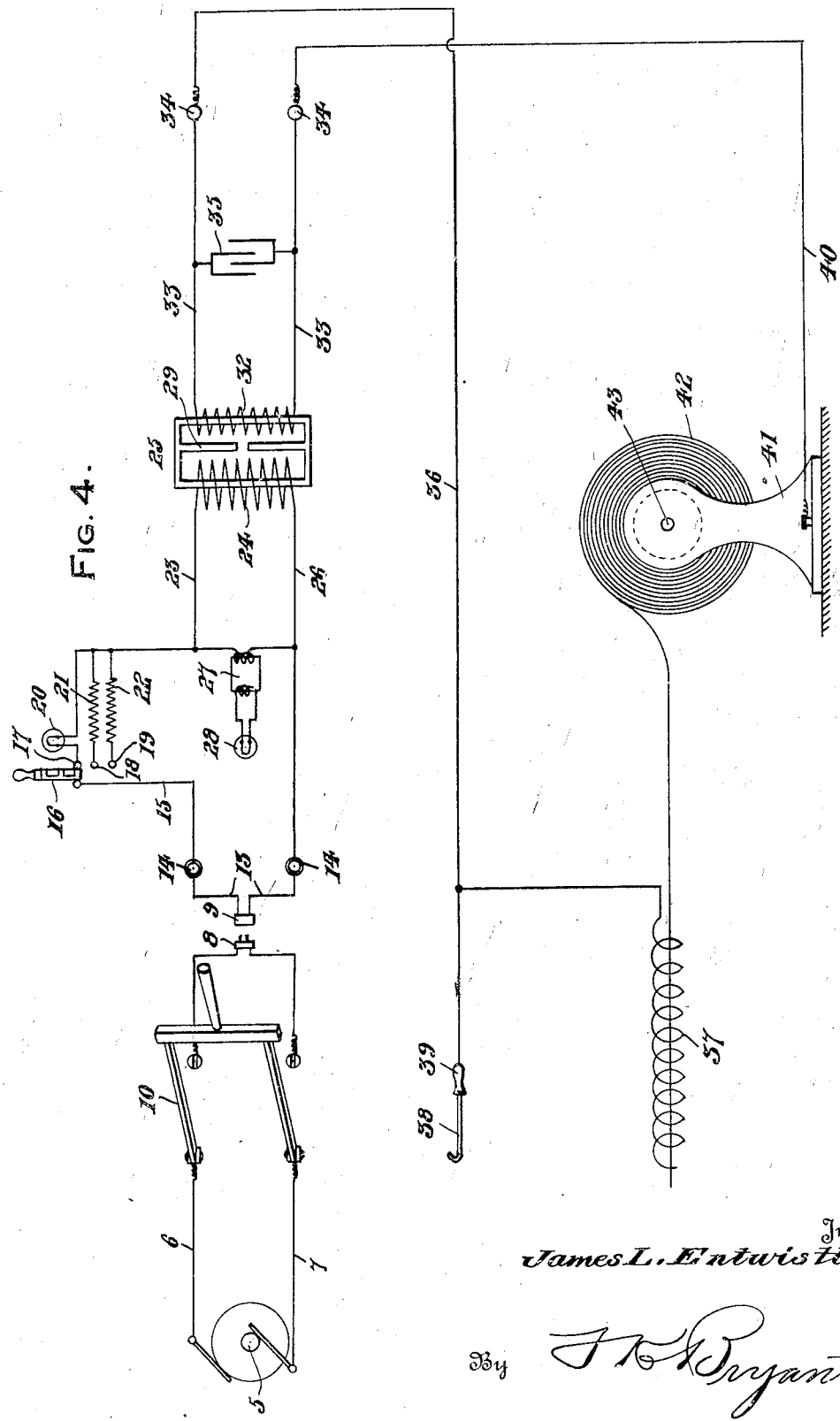

Patented Feb. 3, 1925.

1,525,282

UNITED STATES PATENT OFFICE.

JAMES L. ENTWISTLE, OF CENTRAL FALLS, RHODE ISLAND.

WIRE-INSULATION TESTER.

Application filed October 15, 1921. Serial No. 507,860.

*To all whom it may concern:*

Be it known that I, JAMES L. ENTWISTLE, a citizen of the United States of America, residing at Central Falls, in the county of Providence and State of Rhode Island, have invented certain new and useful Improvements in Wire-Insulation Testers, of which the following is a specification.

This invention relates to certain new and useful improvements in devices for testing the insulation of insulated conductor wires, the present application being a continuation in part of my copending application for wire insulation testers, Serial Number 266,184, filed December 11, 1918.

The primary object of the invention is to provide a wire insulation tester composed of parts connected and related so that the operation of the device will be economical and safe as well as efficient.

Another object of the invention is to generally simplify and improve wire insulation testing devices.

Still another object of the invention is to provide a portable testing unit embodying a casing with the electric elements carried and housed thereby in such manner as to provide a practical construction and involving a minimum number of movable parts.

With the above general objects in view and others that will appear as the nature of the invention is better understood, the invention consists in the novel form, combination and arrangement of parts hereinafter more fully described in connection with the accompanying drawings, and in which like characters of reference indicate corresponding parts throughout the several views.

Figure 3:
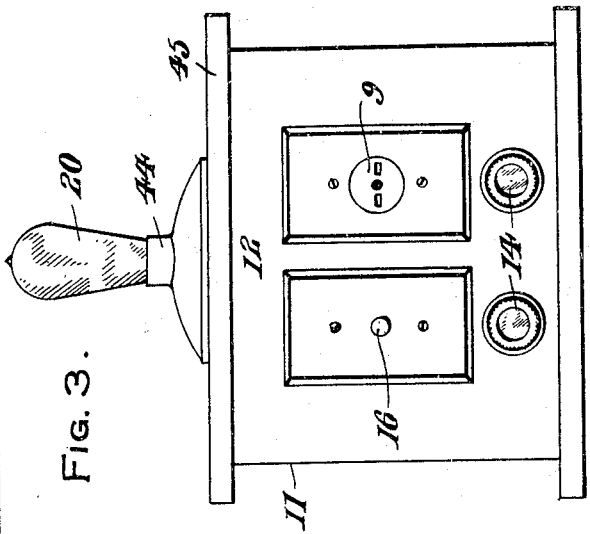
Figure 2:
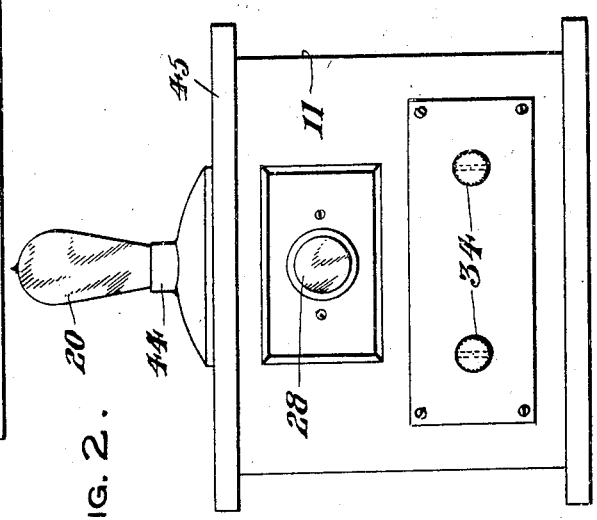

In the drawings,

Figure 1 is a top plan view of the main portion of the testing set with the top of the casing removed, Figure 2 is a front elevational view of the device shown in Figure 1 with the top of the casing in place, Figure 3 is a rear elevational view of the device shown in Figure 1 with the top of the casing in place, and Figure 4 is a diagrammatic view partly in perspective, partly in elevation and partly in plan showing the various elements of the present device and the circuits of the same as well as the complete parts employed in the use of the device.

Referring more in detail to the several views, the present device is adapted to be connected to any A. C. lighting or power mains involving a means 5 for generating A. C. current of commercial frequency and capable of furnishing a current of high amperage. The wires of the main are indicated by the numerals 6 and 7 and the current may be taken from the supply through a separable connector including a double contact plug 8 and receptacle 9, the flow of the current to the plug 8 being controlled in any suitable way as by means of a double pole switch 10.

The present device includes a portable set or unit having a casing 11 preferably of rectangular form with the receptacle 9 mounted in the rear wall 12 thereof. Wires 13 lead from the receptacle 9 to individual fuses 14 which are preferably mounted in the wall 12 beneath the receptacle 9 in such manner that said fuses may be changed when necessary from the exterior of the casing. A wire 15 leads from one of the fuses 14 to one side of a three-way electrolier switch 16 which is preferably of the indicating type adapted to engage contacts 17, 18 and 19 respectively connected to one side of a low current capacity indicating lamp 20, a resistance coil 21 and a second resistance coil 22 for connecting these various elements in parallel, said lamp and resistance coils all being connected at their other sides by means of wire 23 with one side of the primary winding or coil 24 of a low capacity step-up transformer 25. The transformer 25 is preferably of the closed core type and its primary winding 24 is connected at its other side by means of a wire 26 with the other fuse 14 so that the lamp 20 and resistances 21 and 22 are in series parallel with the primary coil 24 in the primary circuit.

A small step-down transformer 27 is connected across the primary circuit with one of its windings connected with a pilot lamp 28 which is of low voltage and which accordingly has a short filament not easily broken by the oscillation which I have found to occur in the long filament high voltage lamps due to the inductance from the high tension circuit.

The transformer 25 is provided with a magnetic leakage gap or shunt 29 and is mounted within the casing 11 beneath a transverse support 30 upon which the resistance coils 21 and 22 are mounted, while the transformer 27 is preferably fixed to a side wall of the casing 11 between the rear wall 12 and the resistance as shown in Figure 1. The wires from the transformer 27 lead to an outlet box 31 fixed to the front wall of the casing 11 and carrying a socket for the lamp 28. Also, the electrolier switch 16 and the receptacle 9 are mounted side by side in outlet boxes 46, 47, fixed to the rear wall of the casing 11.

The secondary winding or coil 32 of the transformer 25 is connected by means of leads 33 with a pair of high tension binding posts 34 which are preferably fixed in the front wall of the casing 11 beneath the pilot lamp 28, and a condenser 35 is connected by means of suitable wires to the leads 33 so that said condenser is connected across the secondary circuit of the device, as will be apparent.

From the foregoing, it will be seen that the elements 5, 6, 7, 8, and 10 are separate and apart from the portable part of the device, and that the remaining elements thus far described are carried or housed by the casing 11 so as to provide a portable unit. In using the present device, a separate testing wire 36 is employed which is adapted to be connected at one end to one of the binding posts 34 and which has at its other end a helical testing contact or coil 37 as well as a testing hook 38, the coil 37 and hook 38 being wired in parallel with the wire leading to the hook of such length as to permit engagement of the hook with the wire being tested at a point outwardly of the coil 37 whereby bad insulation may be detected finally and quickly after the same has passed through said coil 37. The hook 38 is preferably provided with a handle 39 which is well insulated, and the other high tension binding post 34 is connected by means of a wire 40 to the reel bracket 41 which carries the roll of wire 42. The bracket 41 is provided with a suitable reel rotatably mounted upon a shaft 43. The wire 42 is wound upon said reel and suitably electrically connected through the shaft 43 to the bracket 41. The free end of the wire 42, having the insulation which is to be tested, is fed in any suitable manner through the testing coil 37. As shown in Figure 1, the condenser 35 is preferably located in the rear of the high tension winding or coil of the transformer 25 and under resistances 21 and 22 so as to provide a neat and compact arrangement of the various parts, while the lamp 20 is suitably removably mounted in a socket 44 secured upon the upper surface of the cover 45 of the casing 11.

In operation, the switch 10 is closed and plug 8 is inserted in the receptacle 9 with the entire apparatus protected by the fuses 14. The current flows to the transformer 27 and immediately causes lighting of the lamp 28, and the latter visibly indicates that the high tension terminals or binding posts 34 are alive, whereby subjecting the operator to annoying shocks is reduced to a minimum as would occur should the operator not be warned that the current was on and he should unknowingly grasp the binding post 34 at such time. The wire 42 is fed longitudinally through the testing coil 37 in any well known or preferred manner and with the voltage impressed across the primary circuit, a high voltage will be induced across the secondary circuit and will have the same frequency as the primary frequency. As poor insulation passes the testing terminal 37, the resistance of the secondary circuit is accordingly decreased and the spark jumps the gap from the terminal 37 to the wire 42 being tested. At this instant, the current in the secondary circuit is, due to the condenser, of very high amperage, which causes a crater to be burned in the poor insulation and the spark produced is exceedingly loud and bright due to said high current, thus insuring a positive location of the faulty insulation.

Due to the oscillations set up by the discharging of the condenser when the spark occurs, the high current mentioned is of a high frequency and is therefore safe, as distinguished from a low frequency current at the same voltage as would be the case were the condenser omitted.

As the resistance in the secondary circuit becomes very low due to the carbonizing of the insulator material around the fault in the wire insulation being tested, the current in and the voltage across the secondary circuit become negligible due to the shunting of the flux, induced by the primary winding of the transformer, through the magnetic gap. This shunting of the flux also limits the current in the primary circuit so that, even upon continued short circuiting, the apparatus will not overheat and danger of damage to the device is prevented. The magnetic gap or shunt 29 is adjusted so as to limit the current in the primary circuit, when the secondary circuit is shorted, to an amperage which is necessary to light the indicating lamp 20 to full brilliancy and the lamp 20 is of comparatively low voltage, so as to not cut down the supply voltage at the period of spark discharge. The indicating lamp 20 is of low current capacity so that it will light instantly to full brilliancy without the lagging which is due to heating the heavy filaments used in high current capacity lamps. A feature of the leakage gap 29 is that the same insures drawing of a current from the supply of no greater value than that required for brilliant lighting of the low current capacity lamp 20, whereby the voltage impressed across the primary is reduced only by the rated voltage of said low voltage lamp, therefore reducing the secondary voltage only a correspondingly small amount. This maintaining of the high voltage in the secondary hastens the carbonizing of the insulating material of the wire being tested, and also insures the locating of a second fault which may enter the coil 37 before the first fault leaves it.

As the carbonizing of the insulating material takes place, the resistance between the testing terminal 37 and the wire 42 detesting creases and the voltage in the secondary circuit drops. At this time, the current in the secondary winding of the transformer 25 sets up an opposing magneto-motive force which forces the flux through the magnetic shunt instead of allowing the same to flow through the secondary winding, and in this way the current and voltage in the secondary becomes substantially negligible to prevent overheating of the secondary while at the same time allowing enough current to flow in the primary circuit to keep the lamp brilliant.

During the period of high current in the secondary or when the spark occurs, said high current does not flow in the secondary winding of the transformer 25 but merely flows in the circuit of the condenser and the gap and their connecting wires so that by the use of the condenser, a low capacity transformer may be used and yet a high voltage, high amperage current will be available for producing a loud bright spark and burning a crater around the fault in the insulation of the wire being tested.

By the use of the electrolier switch 16, lamp 20 and resistances 21 and 22, the voltage may be increased across the primary and secondary so that wires with different thicknesses of insulating material may be tested with substantially equal efficiency by the present device.

From the foregoing description, it is believed that the construction and operation of the present invention as well as the advantages thereof will be readily understood and appreciated by those skilled in the art.

Minor changes may be made without departing from the spirit and scope of the invention as claimed.

What is claimed as new is:

1. A device for testing the insulation of insulated wires comprising a step-up transformer having a magnetic leakage gap, for making the step-up transformer have a high magnetic leakage, a primary circuit having means to be connected to a source of electricity and including the primary winding of said transformer, a testing terminal, means to electrically connect said terminal to one side of the secondary winding of the transformer, means to electrically connect the wire to be tested to the other side of said secondary winding, a condenser connected to opposite sides of said secondary winding, a casing in which the transformer, condenser and first named means is carried, the means for connecting the secondary winding to the testing terminal and to the wire being tested including high tension binding posts projecting outwardly from one wall of the casing, a tell-tale lamp above said high-tension binding posts, a step-down transformer mounted within the casing and connected to said lamp, and means connecting the step-down transformer across the primary circuit.

2. A device for testing the insulation of insulated wires comprising a casing having a pair of high tension binding posts mounted upon the exterior of one wall thereof, a low capacity step-up transformer arranged within the casing and having its secondary winding connected by a pair of leads to said binding posts, a condenser connected across said leads and arranged within the casing, a receptacle mounted in another wall of the casing adapted for connection with a source of commercial frequency A. C. electric current supply and connected to opposite sides of the primary of said transformer, an indicating lamp in series with the primary of comparatively low rated voltage, and a magnetic leakage gap for making the step-up transformer have a high magnetic leakage for the transformer adjusted to limit the current in the circuit of the primary winding to an amperage proper to light said indicating lamp to full brilliancy when the circuit of the secondary winding is shorted, said indicating lamp being mounted so as to be visible from the exterior of the casing.

3. A device for testing the insulation of insulated wires comprising a casing having a pair of high tension binding posts mounted upon the exterior of one wall thereof, a low capacity step-up transformer arranged within the casing and having its secondary winding connected by a pair of leads to said binding posts, a condenser connected across said leads and arranged within the casing, a receptacle mounted in another wall of the casing adapted for connection with a source of commercial frequency A. C. electric current supply and connected to opposite sides of the primary of said transformer, an indicating lamp in series with the primary, a magnetic leakage gap for making the step-up transformer have a high magnetic leakage, for the transformer adjusted to limit the current in the circuit of the primary winding to an amperage proper to light said indicating lamp to full brilliancy when the circuit of the secondary winding is shorted, said indicating lamp being mounted so as to be visible from the exterior of the casing, a step-down transformer connected across the circuit of the primary winding of the first named transformer, and a tell-tale lamp connected to the step-down transformer and mounted in the casing above said binding posts so as to be visible exteriorly of the casing.

4. A device for testing the insulation of insulated wires comprising a casing having a pair of high tension binding posts mounted upon the exterior of one wall thereof, a low capacity step-up transformer arranged within the casing and having its secondary winding connected by a pair of leads to said binding posts, a condenser connected across said leads and arranged within the casing, a receptacle mounted in another wall of the casing adapted for connection with a source of commercial frequency A. C. electric current supply and connected to opposite sides of the primary of said transformer, an indicating lamp in series with the primary, a magnetic leakage gap for making the step-up transformer have a high magnetic leakage for the transformer adjusted to limit the current in the circuit of the primary winding to an amperage proper to light said indicating lamp to full brilliancy when the circuit of the secondary winding is shorted, said indicating lamp being mounted so as to be visible from the exterior of the casing, resistance coils mounted within the casing and connected at one side to one side of the primary winding of the first named transformer in parallel with the indicating lamp, and a three-way electrolier switch mounted in the wall of the casing beside said socket for selectively cutting out the opposite sides of said resistances from the primary circuit or to include the same in the primary circuit with said lamp.

5. In a testing device of the class described, a source of supply of alternating current having a substantially fixed voltage, a step-up transformer having a magnetic leakage gap for producing a high magnetic leakage therein, a primary circuit including the primary coil of said step-up transformer, means for connecting said primary circuit with the source of supply, means for connecting said primary circuit to a step-down transformer, a signal in circuit with the secondary coil of the step-down transformer for indicating when current is flowing through the primary circuit, fuse protection for the primary circuit, means for varying the voltage in the primary circuit, said means including a series of resistance elements adapted to be connected in series parallel in the said circuit, a secondary circuit including the secondary coil of the step-up transformer, a condenser shunted across the secondary circuit, means for electrically connecting one side of the secondary circuit with the conducting portion of the insulated wire to be tested, and a testing terminal connected to the other side of the secondary circuit.

6. In a testing device of the class described, a source of supply of alternating current having a substantially fixed voltage, a step-up transformer having a magnetic leakage gap for producing a high magnetic leakage therein, a primary circuit including the primary coil of said step-up transformer, means for connecting said primary circuit with the source of supply, fuse protection for the primary circuit, a signal light, a step-down transformer having its primary coil shunted across the primary circuit, means for connecting the secondary coil of the step-down transformer through the signal light, means for varying the voltage of the primary circuit, a secondary circuit including the secondary coil of the step-up transformer, a condenser shunted across the secondary circuit, means for electrically connecting one side of the secondary circuit with the conducting portion of the insulated wire to be tested, and a testing terminal connected to the other side of the secondary circuit.

7. In a testing device of the class described, a source of supply of alternating current having a substantially fixed voltage, a step-up transformer having a magnetic leakage gap for producing a high magnetic leakage therein, a primary circuit including the primary coil of said step-up transformer, means for connecting said primary circuit with the source of supply, fuse protection for the primary circuit, means for varying the voltage in the primary circuit including a series of resistance coils and a switch element adapted for connecting the said coils in series parallel in the primary circuit, a step-down transformer having its primary coil shunted across the primary circuit, a signal element connected in series with the secondary coil of the step-down transformer for producing a signal when current is flowing through the primary circuit, a secondary circuit including the secondary coil of the step-up transformer, a condenser shunted across the secondary circuit, a metallic bracket for supporting a coil of wire to be tested, the said coil of wire having its inner end grounded on said bracket, means for electrically connecting one side of the secondary circuit with the said metallic bracket, and a pair of testing terminals connected to the other side of the secondary circuit.

In testimony whereof I affix my signature.

JAMES L. ENTWISTLE.